US009621305B2

(12) United States Patent
Aldana

(10) Patent No.: US 9,621,305 B2
(45) Date of Patent: Apr. 11, 2017

(54) BIT PARSER FOR INTERLEAVER IN TRANSMITTER WITH MULTIPLE TRANSMIT ANTENNAS

(71) Applicant: BROADCOM CORPORATION, Irvine, CA (US)

(72) Inventor: Carlos H. Aldana, Mountain View, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 0 days.

(21) Appl. No.: 15/005,144

(22) Filed: Jan. 25, 2016

(65) Prior Publication Data

US 2016/0142183 A1   May 19, 2016

Related U.S. Application Data

(63) Continuation of application No. 11/192,493, filed on Jul. 29, 2005.

(51) Int. Cl.
| | |
|---|---|
| H04B 7/02 | (2006.01) |
| H04L 1/02 | (2006.01) |
| H04L 1/00 | (2006.01) |
| H04L 1/06 | (2006.01) |
| H04B 7/06 | (2006.01) |

(52) U.S. Cl.
CPC ......... *H04L 1/0071* (2013.01); *H04B 7/0684* (2013.01); *H04L 1/003* (2013.01); *H04L 1/0625* (2013.01); *H04L 1/0003* (2013.01)

(58) Field of Classification Search
None
See application file for complete search history.

(56) References Cited

U.S. PATENT DOCUMENTS

| | | | |
|---|---|---|---|
| 2004/0097215 A1* | 5/2004 | Abe ....................... | H04L 1/0059 455/403 |
| 2005/0265469 A1* | 12/2005 | Aldana ................. | H04L 1/0059 375/260 |
| 2006/0013330 A1* | 1/2006 | Ha ........................ | H04B 7/0602 375/267 |
| 2006/0187815 A1* | 8/2006 | Wallace ................ | H04L 1/0041 370/203 |

\* cited by examiner

*Primary Examiner* — Shuwang Liu
*Assistant Examiner* — Gina McKie
(74) *Attorney, Agent, or Firm* — Garlick & Markison; Shayne X. Short

(57) ABSTRACT

A transmitter having two or more transmit antennas includes a bit parser for providing two or more data streams to an interleaver of the transmitter. The bit parser receives bits representing data to be transmitted over the transmit antennas, and parses the bits into a number of data streams equal to a number of the transmit antennas such that the bits are divided into bit groups, each having no more than two of the bits, and each of the data streams include non-adjacent ones of the bit groups.

20 Claims, 8 Drawing Sheets

BIT PARSER FOR INTERLEAVER IN TRANSMITTER WITH MULTIPLE TRANSMIT ANTENNAS

CROSS REFERENCE TO RELATED PATENTS/PATENT APPLICATIONS

The present U.S. Utility patent application claims priority pursuant to 35 U.S.C. §120 as a continuation of U.S. Utility application Ser. No. 11/192,493 entitled "Bit parser for interleaver in transmitter with multiple transmit antennas," filed Jul. 29, 2005, pending, which is hereby incorporated herein by reference in its entirety and made part of the present U.S. Utility patent application for all purposes.

BACKGROUND OF THE INVENTION

Technical Field of the Invention

This invention relates generally to wireless communication systems and in particular to a transmitter transmitting at high data rates within such wireless communication systems.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into in-phase and quadrature-phase (IQ) baseband signals or intermediate frequency (IF) signals. The filtering stage filters the IQ baseband signals or the IF signals to attenuate unwanted out of band signals to produce filtered signals. The data recovery stage recovers raw data from the filtered signals in accordance with the particular wireless communication standard.

Typically, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-input-single-output (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Regardless of the type of communication (e.g., SISO, SIMO, MISO and MIMO), the bits forming the raw data are typically interleaved prior to transmission to try to combat the noise problems associated with communication of information (data) across a communication channel. One example of a particularly problematic noise problem is burst noise error arising from impulse actions within the communication channel. By interleaving blocks of data at one end of the communication channel throughout multiple code words, the likelihood of losing entire blocks of data during the communication through the communication channel is reduced, thereby reducing the bit error rate of the communication channel. A common interleaver design is a row-column interleaver, in which bits are read into the interleaver in rows and read out of the interleaver in columns. Row-column interleavers typically operate so that adjacent bits are mapped onto nonadjacent subcarriers (frequencies) and adjacent coded bits are mapped alternatively onto less and more significant bits (LSB/MSB) of the constellation.

With multiple input communications (e.g., MISO and MIMO), the bits forming the raw data must also be parsed (distributed) over multiple transmit paths prior to interleaving to produce the multiple streams of data that are each transmitted over a separate antenna. Bit parsing allows separation of adjacent bits not only in position (MSB/LSB) and frequency, but also in space (between transmit antennas), which further reduces the bit error rate in MISO and MIMO communications. Thus, the bit error rate in MISO and MIMO communications is dependent upon the particular bit parsing mechanism employed in the bit parser.

Therefore, a need exists for a bit parser for an interleaver in a transmitter including multiple transmit antennas that produces a low bit error rate.

DETAILED DESCRIPTION OF THE INVENTION

Figure 1:
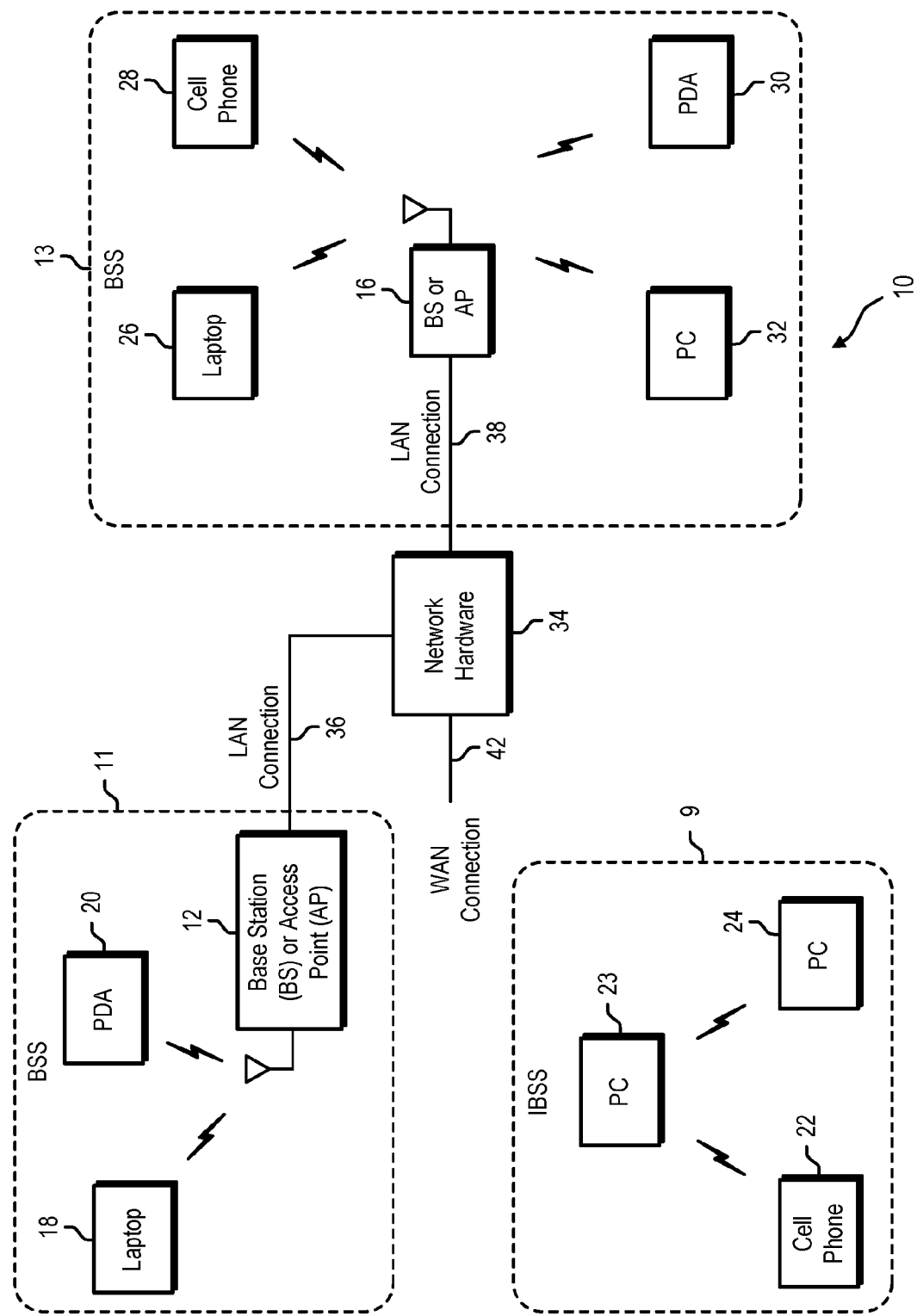
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et-cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
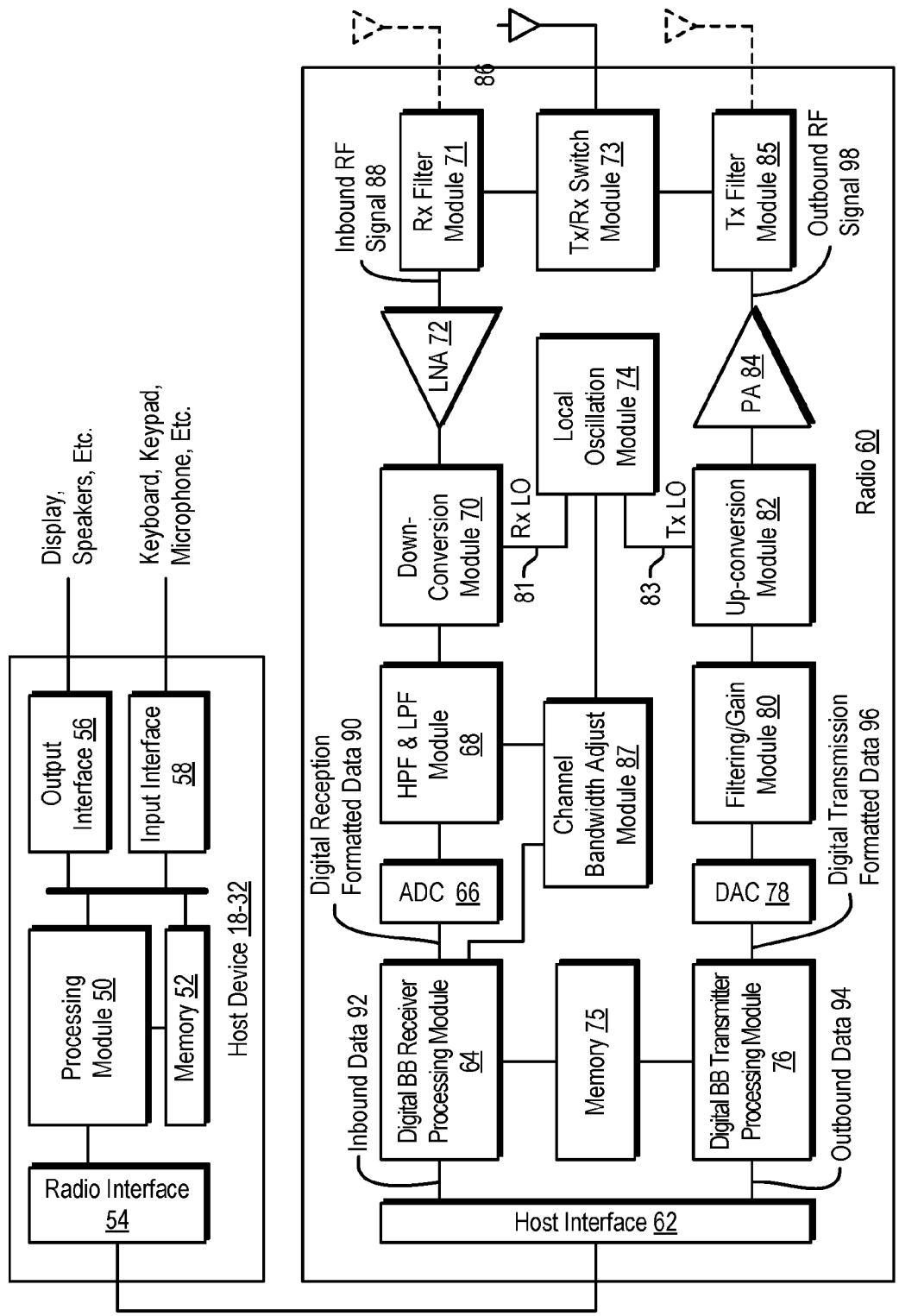
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11(a), 802.11(b), 802.11(g), 802.11(n), Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters the inbound low IF signals or baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
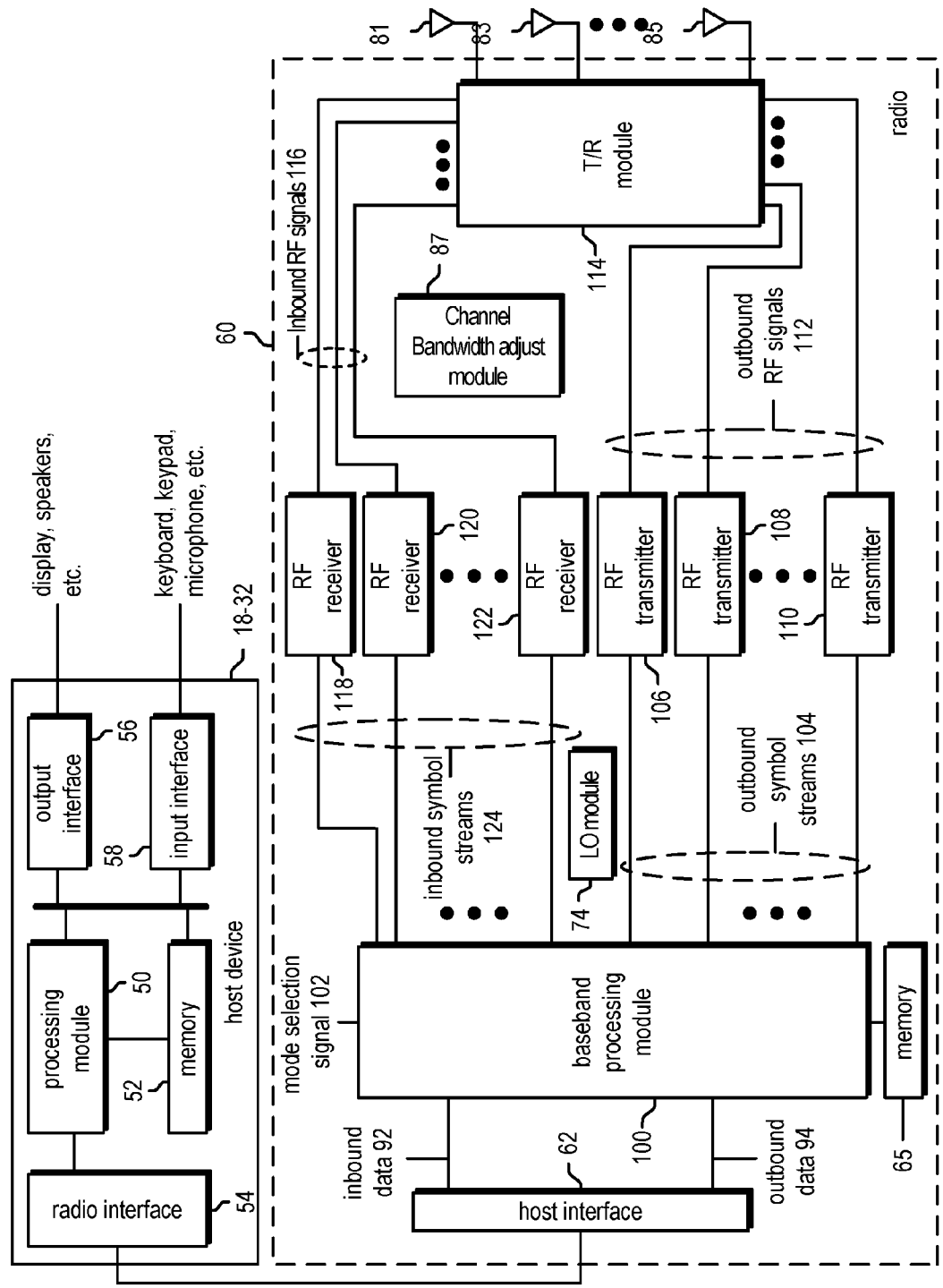
FIG. 3 is a schematic block diagram of another wireless communication device capable of operating in multiple modes in accordance with the present invention.

FIG. 3 is a schematic block diagram illustrating a wireless communication device that includes the host device 18-32 and an associated radio 60 capable of operating in multiple operating modes (e.g., SISO, SIMO, MISO and MIMO). For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
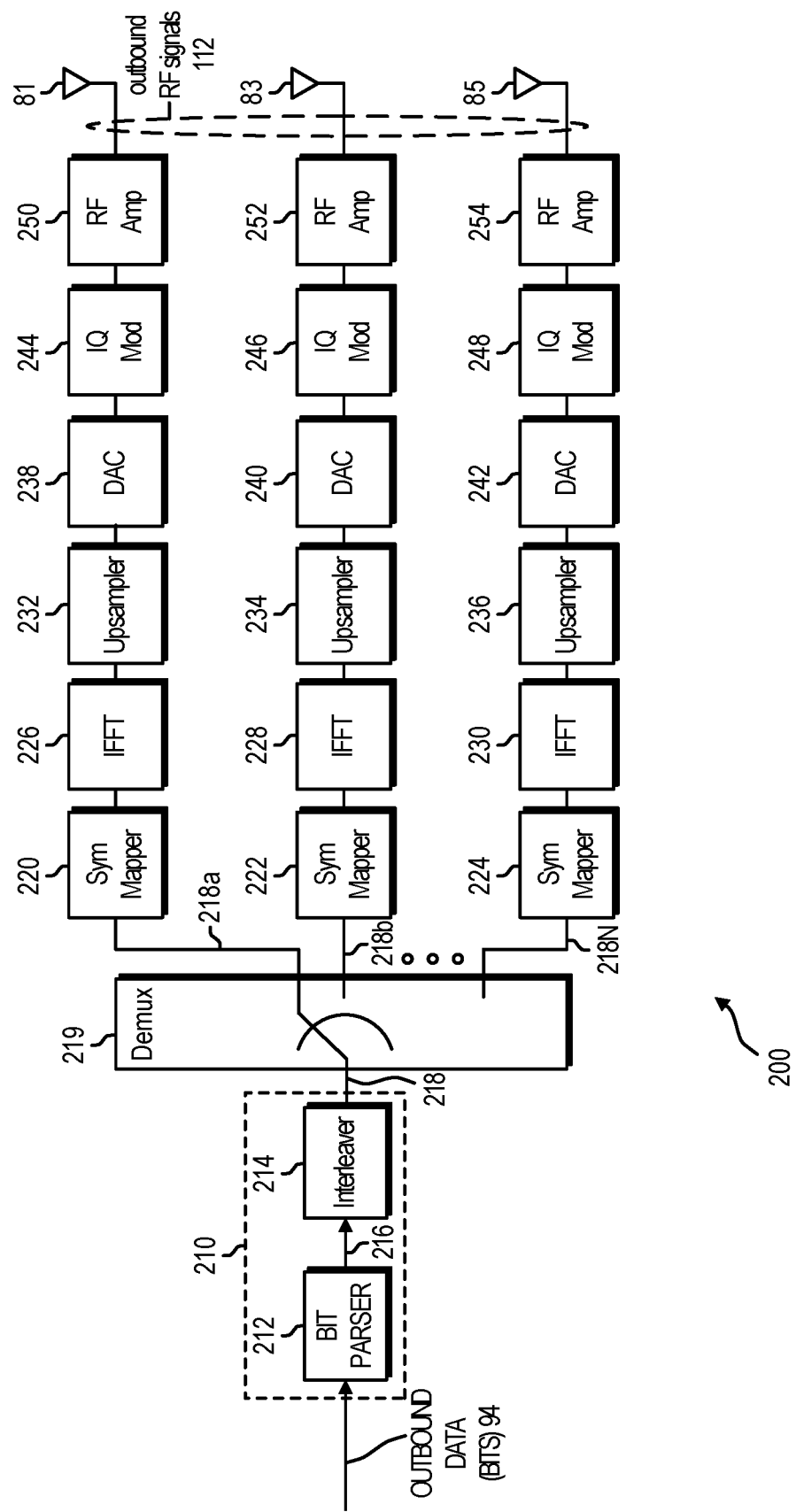
FIG. 4 is a schematic block diagram illustrating a bit parser and interleaver for a transmitter of the wireless communication device of FIG. 3 in accordance with the present invention.

FIG. 4 is a schematic block diagram illustrating in more detail a radio frequency (RF) transmitter 200 including multiple transmit antennas 81, 83 and 85. FIG. 4 illustrates exemplary components of both a baseband processing portion of the transmitter 200 and a radio portion of the transmitter 200. The radio portion can, for example, correspond to RF transmitters 106-110 shown in FIG. 3. In FIG. 4, the baseband processing portion of the transmitter 200 includes bit parser 212, interleaver 214, demultiplexer 219, a plurality of symbol mappers 220-224 and a plurality of inverse fast Fourier transform (IFFT)/cyclic prefix addition modules 226-228. In one embodiment, the bit parser 212 and interleaver 214 are separate nodes. In another embodiment, the bit parser 212 and interleaver 214 are combined to form an integrated interleaver 210. The radio portion of the transmitter 200 includes a plurality of digital filter/up-sampling modules 232-236, digital-to-analog conversion modules 238-242, I/Q modulators 244-248, RF amplifiers 250-254 and antennas 81-85.

In operation, the bit parser 212 parses the outbound data bits 94 into multiple data streams 216, each corresponding to a particular transmit antenna 81-85. The number of data streams 216 is equal to the number of operating transmit antennas 81-85. For example, depending on the particular operating mode (e.g., SISO, SIMO, MISO or MIMO), one or more of the transmit antennas 81-85 may be active. The bit parser 212 parses the outbound data bits 94 into a number of data streams 216 equal to the number of active transmit antennas 81-85. The bit parser 212 divides the outbound data bits 94 into bit groups of consecutive bits, in which each bit group includes no more than two of the bits 94. For constellations in which each constellation point is represented by a single bit, each bit group includes only a single bit. For constellations in which each constellation point is represented by two or more bits, each bit group includes two bits. The bit parser 212 then maps the bit groups onto the data streams 216 such that adjacent bit groups are not placed on the same data stream 216. Thus, each of the data streams 216 includes non-adjacent bit groups.

The interleaver 214 receives the data streams and spreads the bits in each of the data streams over multiple symbols to produce a serial interleaved data stream 218 containing the individual interleaved data streams for each transmit antenna 81-85. The interleaver 214 may be, for example, a row-column interleaver in which bits are read into the interleaver 214 in rows and read out of the interleaver 214 in columns. Row-column interleavers 214 typically operate so that adjacent bits are mapped onto nonadjacent subcarriers (frequencies) and adjacent coded bits are mapped alternatively onto less and more significant bits (LSB/MSB) of the constellation. The demultiplexer 219 converts the serial interleaved data stream 218 from interleaver 214 into N-parallel streams 218a-218N for transmission. As a result, the interleaved data streams 218a-218N are spatially separated onto different transmit paths corresponding to different ones of the transmit antennas 81-85.

Each symbol mapper 220-224 receives a corresponding one of the N-parallel paths of data 218a-218N from the demultiplexer 219, and maps the data stream to quadrature amplitude modulated QAM symbols (e.g., BPSK, QPSK, 16 QAM, 64 QAM, 256 QAM, et cetera) according to a specific rate table. For IEEE 802.11(a) backward compatibility, double gray coding may be used. The QAM symbols produced by each of the symbol mappers 220-224 are provided to the IFFT/cyclic prefix addition modules 226-230, which perform frequency domain to time domain conversions and optionally add a prefix, which allows removal of inter-symbol interference at the receiver. For example, a 64-point IFFT can be used for 20 MHz channels and 128-point IFFT can be used for 40 MHz channels.

The number of IFFT outputs corresponds to the number of antennas 81-85 that are active. For example, if only one antenna (e.g., antenna 81) is active, only IFFT 226 will produce an output. As one of average skill in the art will appreciate, the number of output paths may range from one to any desired number. The outputs from the IFFT modules 226-228 are received by respective digital filtering/up-sampling modules 232-236. In one embodiment, the digital filters/up sampling modules 232-236 are part of the digital baseband processing module and the remaining components form a plurality of RF front-ends. The digital filtering/up-sampling modules 232-236 filter the corresponding symbols and adjust the sampling rates to correspond with the desired sampling rates of the digital-to-analog conversion modules 238-242.

The digital-to-analog conversion modules 238-242 convert the digital filtered and up-sampled signals into corresponding in-phase and quadrature analog signals, and provide the analog signals to the corresponding I/Q modulators 244-248. The I/Q modulators 244-248 based on a local oscillation, which is produced by a local oscillator (not shown), up-converts the I/Q signals into radio frequency signals. The RF amplifiers 250-254 amplify the RF signals before providing the outbound RF signals 112 to antennas 81-85.

Figure 5:
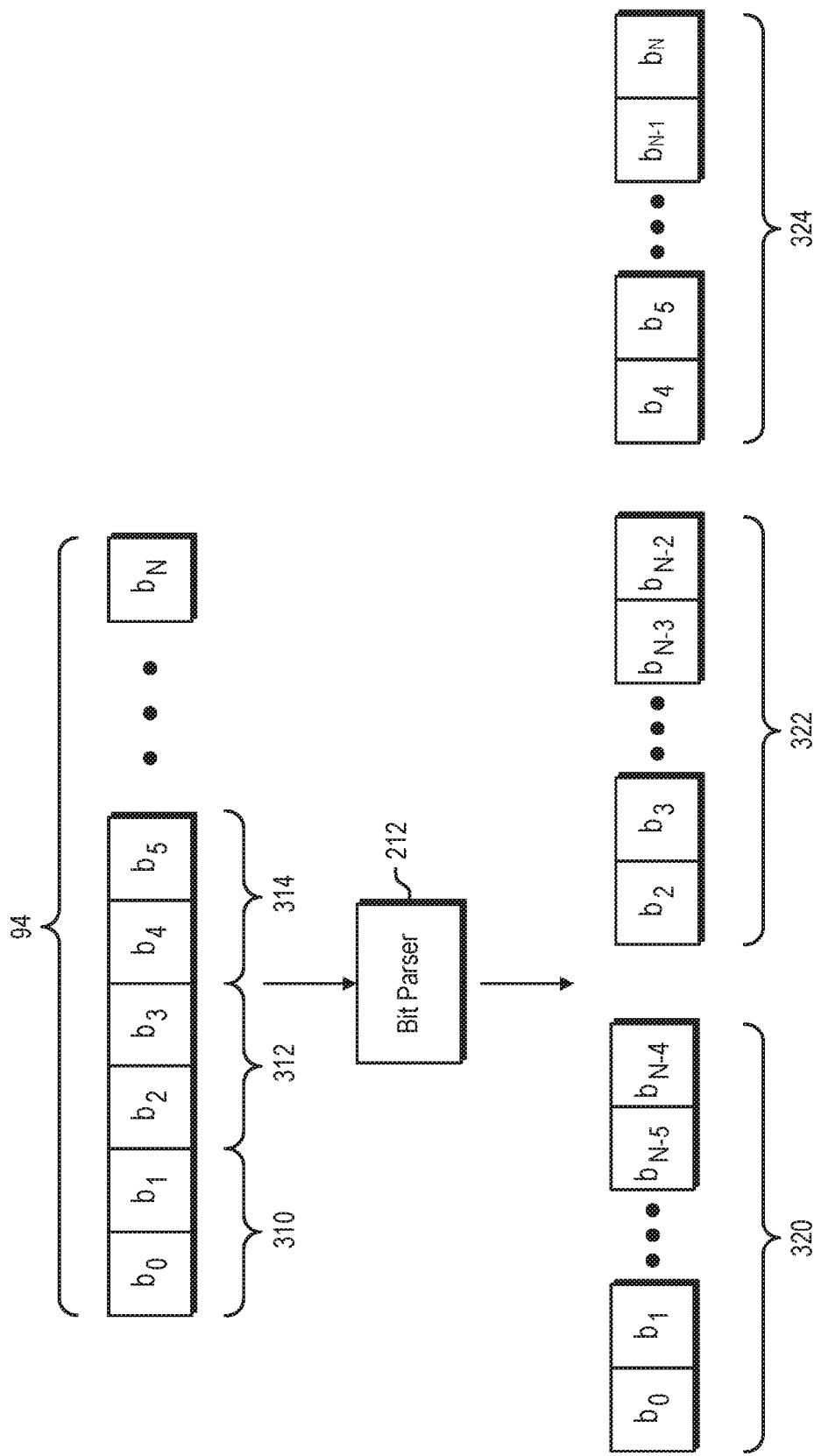
FIG. 5 is a diagram of an exemplary parsed bit stream for input to the interleaver of FIG. 4 in accordance with the present invention.

FIG. 5 is a diagram of an exemplary parsed bit stream for input to the interleaver of FIG. 4 in accordance with the present invention. The outbound data bits 94 are shown to include bits $b_0 \ldots b_N$. The outbound data bits 94 are input to the bit parser 212, which divides the outbound data bits 94 into bit groups 310-314 of consecutive bits, in which each bit group 310-314 includes no more than two of the bits 94. For example, bit group 310 includes bits $b_0$ and $b_1$, bit group 312 includes bits $b_2$ and $b_3$ and bit group 314 includes bits $b_4$ and $b_5$.

The bit parser 212 then maps the bit groups 310-314 onto data streams 320-324 such that adjacent bit groups are not placed on the same data stream. The data streams 320-324 correspond to, for example, the data stream 216 shown in FIG. 4. For example, data stream 320 includes bit group 310 formed of bits $b_0$ and $b_1$, data stream 322 includes bit group 312 formed of bits $b_2$ and $b_3$ and data stream 324 includes bit group 314 formed of bits $b_4$ and $b_5$. Thus, adjacent bit groups (e.g., bit groups 310 and 312) are not placed on the same data stream. The bit parser 212 continues to map bit groups onto data streams 320-324, until all bit groups have been mapped onto one of the data streams 320-324. For example, the last three bit groups ($b_{N-5}$ and $b_{N-4}$, $b_{N-3}$ and $b_{N-2}$ and $b_{N-1}$ and $b_N$) are mapped onto the data streams 320-324 as shown in FIG. 5. Although three data streams 320-324 are shown in FIG. 5, in operation, the number of data streams corresponds to the number of active transmit antennas.

Figure 6:
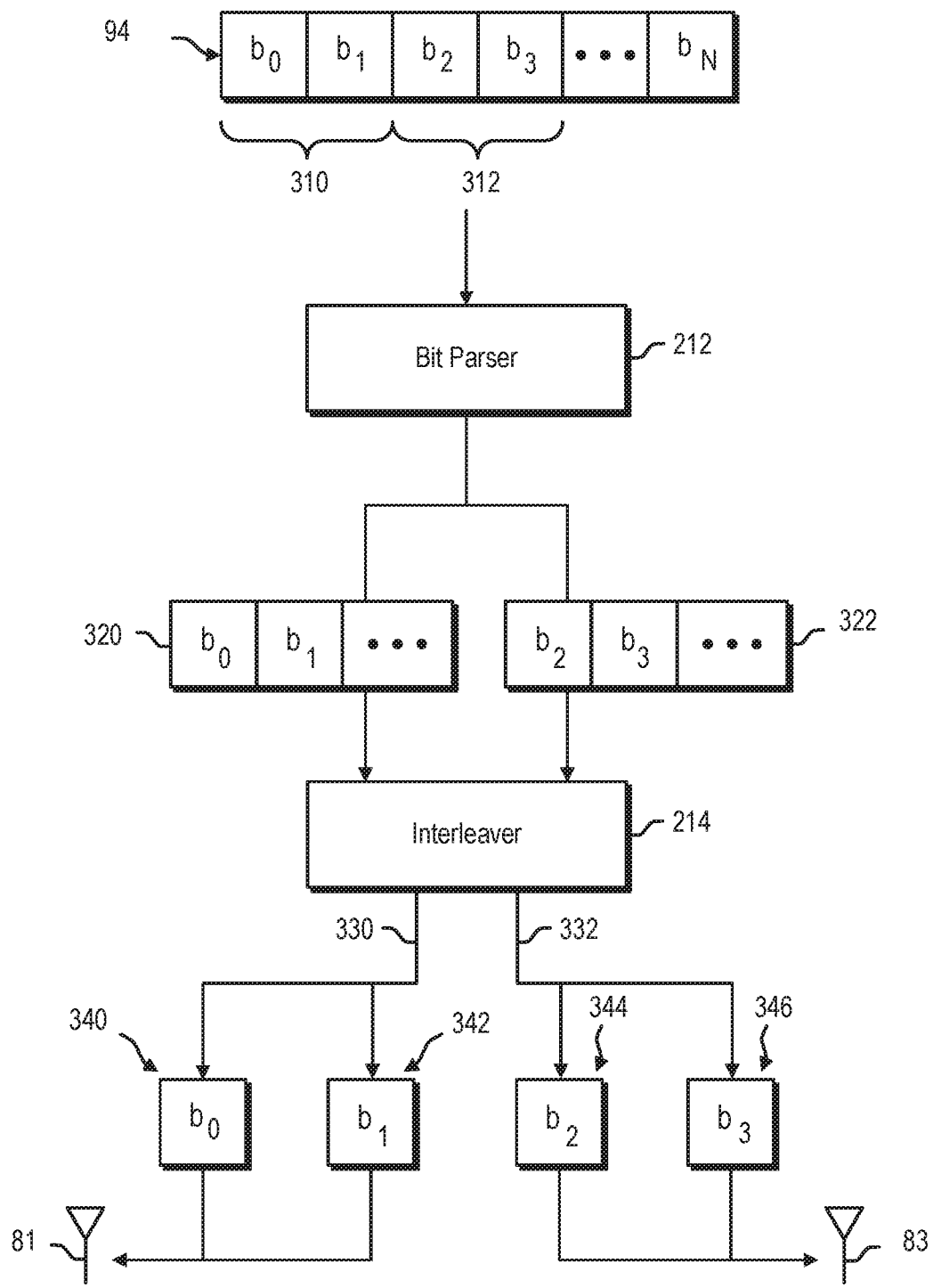
FIG. 6 is a diagram of exemplary interleaved data streams using the bit parser and interleaver of FIG. 4 in accordance with the present invention.

FIG. 6 is a diagram of exemplary interleaved data streams using the bit parser and interleaver of FIG. 4 in accordance with the present invention. Again, the outbound data bits 94 are shown to include bits $b_0 \ldots b_N$. The outbound data bits 94 are input to the bit parser 212, which divides the outbound data bits 94 into bit groups 310 and 312 of consecutive bits, as described above. For example, bit group 310 includes bits $b_0$ and $b_1$ and bit group 312 includes bits $b_2$ and $b_3$. The bit parser 212 then maps the bit groups 310 and 312 onto data streams 320 and 322 such that adjacent bit groups are not placed on the same data stream, as described above. For example, data stream 320 includes bit group 310 formed of bits $b_0$ and $b_1$ and data stream 322 includes bit group 312 formed of bits $b_2$ and $b_3$.

The data streams 320 and 322 are input to the interleaver 214, which spreads the bits in each of the data streams 320 and 322 over multiple symbols to produce a serial interleaved data stream containing the individual interleaved data streams 330 and 332 for each transmit antenna 81 and 83. The interleaver 214 may be, for example, a row-column interleaver in which bits are read into the interleaver 214 in rows and read out of the interleaver 214 in columns. Row-column interleavers 214 typically operate so that adjacent bits are mapped onto nonadjacent subcarriers (frequencies) and adjacent coded bits are mapped alternatively onto less and more significant bits (LSB/MSB) of the constellation. For example, as shown in FIG. 6, adjacent bits $b_0$ and $b_1$ are mapped onto different subcarriers (tones) 340 and 342 for transmit antenna 81, while adjacent bits $b_2$ and $b_3$ are mapped onto different tones 344 and 346 for transmit antenna 83.

Figure 7:
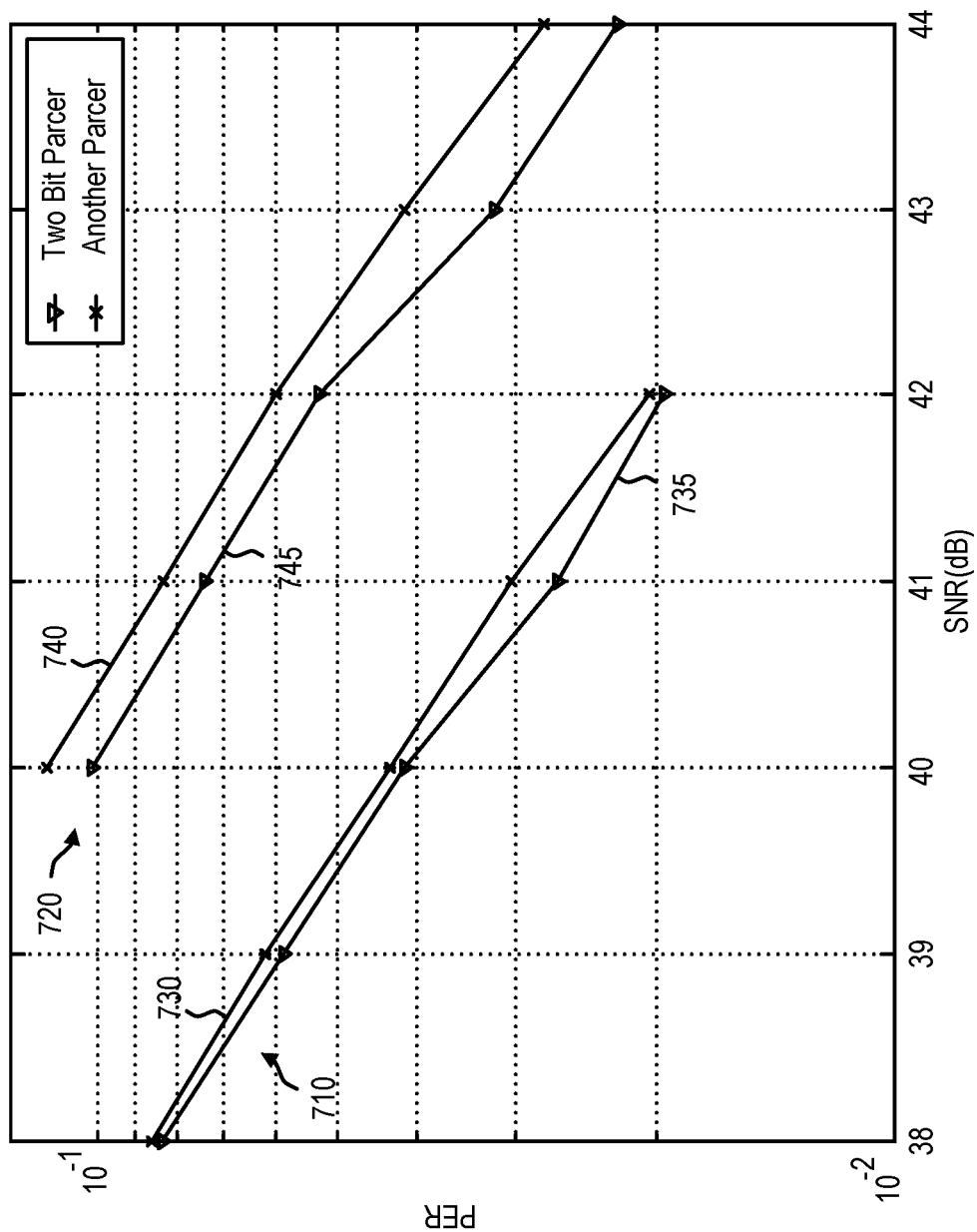
FIG. 7 is a plot illustrating improved performance of the bit parser in accordance with the present invention.

FIG. 7 is a plot illustrating improved performance of the bit parser in accordance with the present invention. In a simulation, the performance of the bit parser of the present invention (two-bit parser) was compared to the performance of another bit parser for both a 3×3 system (i.e., three transmit antennas and three receive antennas) 710 and a 4×4 system (i.e., four transmit antennas and four receive antennas) 720. The performance of the bit parser of the present invention is plotted by triangular points on lines 735 (for the 3×3 system) and 745 (for the 4×4 system), where the performance of the other bit parser is plotted by hatch marks on lines 730 (for the 3×3 system) and 740 (for the 4×34 system). The simulation was conducted according to the IEEE 802.11(n) proposed channel mode. For each bit parser, 1000-byte packets were sent in a 20 MHz transmission with 52 data tones, and 3000 packets were sampled for each SNR (signal-to-noise ratio) point. As can be seen in FIG. 7, the bit parser of the present invention produces a lower SNR than the other bit parser, and therefore, the bit parser of the present invention provides improved performance over that of the other bit parser.

Figure 8:
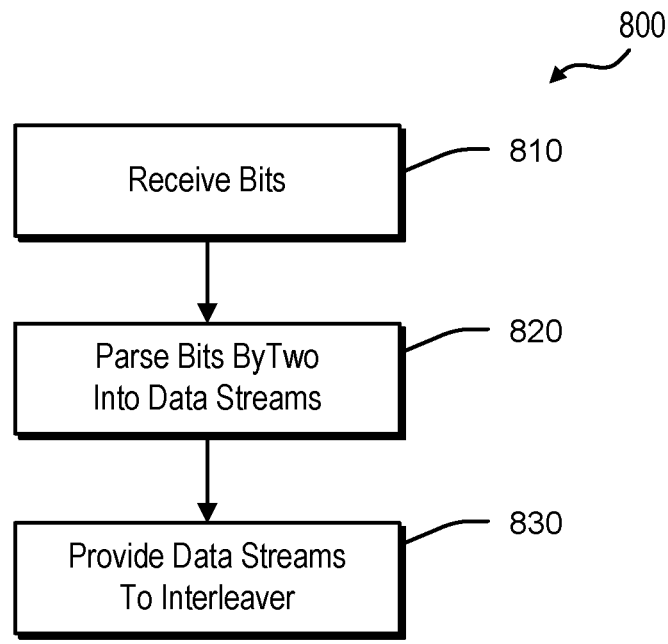
FIG. 8 is a logic diagram of an exemplary process for parsing bits across two or more transmit antennas, in accordance with the present invention.

FIG. 8 is a logic diagram of an exemplary process 800 for parsing bits across two or more transmit antennas, in accordance with the present invention. The processing begins at step 810, where bits representing data to be transmitted over the transmit antennas are received in a bit stream. At step 820, the bits are parsed into a number of data streams equal to a number of operating transmit streams, such that the bits are divided into bit groups of consecutive bits, and each of the bit groups has no more than two of the bits. The bit groups are mapped onto the data streams such that each data stream includes non-adjacent bit groups. Finally, at step 830, the data streams are provided to the interleaver.

Figure 9:
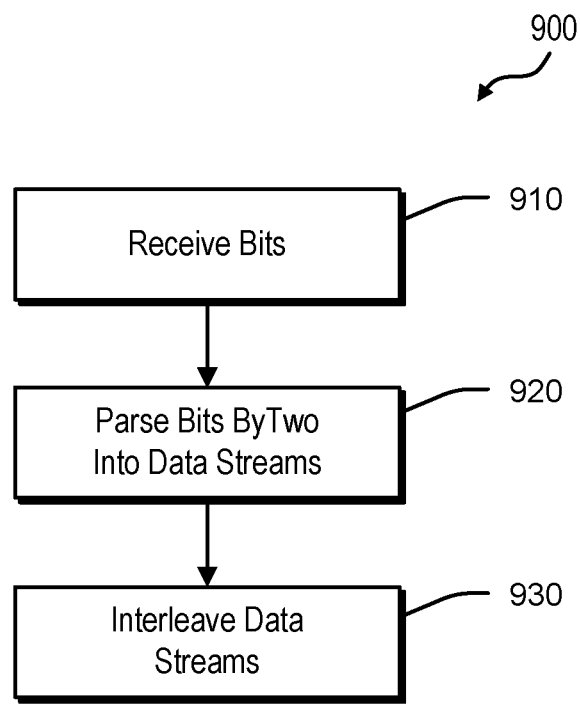
FIG. 9 is a logic diagram of an exemplary process for interleaving data in a transmitter including two or more transmit antennas.

FIG. 9 is a logic diagram of an exemplary process 900 for interleaving data in a transmitter including two or more transmit antennas. The processing begins at step 910, where bits representing data to be transmitted over the transmit antennas are received in a bit stream. At step 920, the bits are parsed into a number of data streams equal to a number of operating transmit antennas, such that the bits are divided into bit groups of consecutive bits, and each of the bit groups has no more than two of the bits. The bit groups are mapped onto the data streams such that each data stream includes non-adjacent bit groups. Finally, at step 930, the bits in each of the data streams are interleaved to produce interleaved data streams that are spatially separated onto different transmit paths corresponding to different ones of the two or more transmit antennas.

As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

The preceding discussion has presented a bit parser for an interleaver in a transmitter including multiple transmit antennas. As one of ordinary skill in the art will appreciate, other embodiments may be derived from the teachings of the present invention without deviating from the scope of the claims.

What is claimed is:
1. A wireless communication device comprising:
a plurality of antennas configured to transmit a plurality of transmission streams to another wireless communication device respectively via the plurality of antennas, wherein a first transmission stream is transmitted via a first antenna, a second transmission stream is transmitted via a second antenna; and
a parser configured to:
receive a block of outbound data bits intended for transmission to the another wireless communication device via the plurality of transmission streams;
divide the block of outbound data bits into a plurality of bit groups, wherein each respective bit group is formed from a same number of different consecutive bits from the block of outbound data bits, and the plurality of bit groups includes a first bit group adjacently followed by a second bit group and also includes a third bit group adjacently followed by a fourth bit group;
generate and output a first data stream for first interleaving to generate the first transmission stream, wherein the first data stream includes the first bit group adjacently followed by the third bit group; and
generate and output a second data stream for second interleaving to generate the second transmission stream, wherein the second data stream includes the second bit group adjacently followed by the fourth bit group, and each of the first data stream and the second data stream excludes any adjacent bit groups of the plurality of bit groups formed from the block of outbound data bits.

2. The wireless communication device of claim 1, wherein:
the plurality of bit groups includes the first bit group adjacently followed by the second bit group adjacently followed by a fifth bit group adjacently followed by a sixth bit group adjacently followed by the third bit group adjacently followed by the fourth bit group;
the first data stream includes the first bit group adjacently followed by the fifth bit group adjacently followed by the third bit group; and
the second data stream includes the second bit group adjacently followed by the sixth bit group adjacently followed by the fourth bit group, and the first data stream and the second data stream include a same number of bits.

3. The wireless communication device of claim 1, wherein:
the plurality of transmission streams also includes a third transmission stream that is transmitted via a third antenna of the plurality of antennas;
the plurality of bit groups includes the first bit group adjacently followed by the second bit group adjacently followed by a fifth bit group adjacently followed by a sixth bit group adjacently followed by the third bit group adjacently followed by the fourth bit group;
the first data stream includes the first bit group adjacently followed by the sixth bit group;
the second data stream includes the second bit group adjacently followed by the sixth bit group adjacently followed by the third bit group; and
the parser is further configured to generate and output a third data stream for third interleaving to generate the third transmission stream, wherein the third data stream includes the fifth bit group adjacently followed by the fourth bit group, and the first data stream, and the second data stream, and the third data stream include a same number of bits.

4. The wireless communication device of claim 1, wherein:
each respective bit group is formed from a different 2 respective consecutive bits from the block of outbound data bits, and the plurality of bit groups includes 2 bits of the first bit group adjacently followed by 2 bits of the second bit group and also includes 2 bits of the third bit group adjacently followed by 2 bits of the fourth bit group;
the first transmission stream is modulated based on a constellation with constellation points respectively represented by more than 2 bits, wherein the first data stream includes the 2 bits of the first bit group adjacently followed by the 2 bits of the third bit group; and
the second transmission stream is also modulated based on the constellation with constellation points respectively represented by more than 2 bits, wherein the second data stream includes the 2 bits of the second bit group adjacently followed by the 2 bits of the fourth bit group.

5. The wireless communication device of claim 1, wherein:
each respective bit group is formed from a different 2 respective consecutive bits from the block of outbound data bits, and the plurality of bit groups includes 2 bits of the first bit group adjacently followed by 2 bits of the second bit group and also includes 2 bits of the third bit group adjacently followed by 2 bits of the fourth bit group;
the first transmission stream is modulated based on a constellation with constellation points respectively represented by 1 bit, wherein the first data stream includes the 2 bits of the first bit group adjacently followed by the 2 bits of the third bit group; and
the second transmission stream is also modulated based on the constellation with constellation points respectively represented by 1 bit, wherein the second data stream includes the 2 bits of the second bit group adjacently followed by the 2 bits of the fourth bit group.

6. The wireless communication device of claim 1, wherein:
each respective bit group is formed from a different 1 bit from the block of outbound data bits, and the plurality of bit groups includes 1 bit of the first bit group composed of adjacently followed by 1 bit of the second bit group and also includes 1 bit of the third bit group adjacently followed by 1 bit of the fourth bit group;
the first transmission stream is modulated based on a constellation with constellation points respectively represented by 1 bit, wherein the first data stream includes the 1 bit of the first bit group adjacently followed by the 1 bit of the third bit group; and
generate the second transmission stream is also modulated based on the constellation with constellation points respectively represented by 1 bit, wherein the second data stream includes the 1 bit of the second bit group adjacently followed by the 1 bit of the fourth bit group.

7. The wireless communication device of claim 1 further comprising:
a wireless station (STA), wherein the another wireless communication device includes an access point (AP).

8. The wireless communication device of claim 1 further comprising:
an access point (AP), wherein the another wireless communication device includes a wireless station (STA).

9. A wireless communication device comprising:
a plurality of antennas configured to transmit a plurality of transmission streams to another wireless communication device respectively via the plurality of antennas, wherein a first transmission stream is transmitted via a first antenna, a second transmission stream is transmitted via a second antenna; and
a parser configured to:
receive a block of outbound data bits intended for transmission to the another wireless communication device via the plurality of transmission streams;
divide the block of outbound data bits into a plurality of bit groups, wherein each respective bit group is formed from a different 2 respective consecutive bits from the block of outbound data bits, and the plurality of bit groups includes 2 bits of a first bit group adjacently followed by 2 bits of a second bit group and also includes 2 bits of a third bit group adjacently followed by 2 bits of a fourth bit group;
generate and output a first data stream for first interleaving to generate the first transmission stream, wherein the first data stream includes the 2 bits of the first bit group adjacently followed by the 2 bits of the third bit group; and
generate and output a second data stream for second interleaving to generate the second transmission stream, wherein the second data stream includes the 2 bits of the second bit group adjacently followed by the 2 bits of the fourth bit group, the first data stream and the second data stream include a same number of bits, and each of the first data stream and the second data stream excludes any adjacent bit groups of the plurality of bit groups formed from the block of outbound data bits.

10. The wireless communication device of claim 9, wherein:
the plurality of bit groups includes the 2 bits of the first bit group adjacently followed by the 2 bits of the second bit group adjacently followed by 2 bits of a fifth bit group adjacently followed by 2 bits of a sixth bit group adjacently followed by the 2 bits of the third bit group adjacently followed by the 2 bits of the fourth bit group;
the first data stream includes the 2 bits of the first bit group adjacently followed by the 2 bits of the fifth bit group adjacently followed by the 2 bits of the third bit group; and
the second data stream includes the second bit group adjacently followed by the sixth bit group adjacently followed by the fourth bit group.

11. The wireless communication device of claim 9, wherein:
the first transmission stream is modulated based on a constellation with constellation points respectively represented more than 2 bits, wherein the first data stream includes the 2 bits of the first bit group adjacently followed by the 2 bits of the third bit group; and
the second transmission stream is also modulated based on the constellation with constellation points respectively represented by more than 2 bits, wherein the second data stream includes the 2 bits of the second bit group adjacently followed by the 2 bits of the fourth bit group.

12. The wireless communication device of claim 9, wherein:
the first transmission stream is modulated based on a constellation with constellation points respectively represented by 1 bit, wherein the first data stream includes the 2 bits of the first bit group adjacently followed by the 2 bits of the third bit group; and
the second transmission stream is also modulated based on the constellation with constellation points respectively represented by 1 bit, wherein the second data stream includes the 2 bits of the second bit group adjacently followed by the 2 bits of the fourth bit group.

13. The wireless communication device of claim 9 further comprising:
a wireless station (STA), wherein the another wireless communication device includes an access point (AP).

14. A method for execution by a wireless communication device, the method comprising:
via a plurality of antennas of the wireless communication device, transmitting a plurality of transmission streams to another wireless communication device respectively via the plurality of antennas, wherein a first transmission stream is transmitted via a first antenna, a second transmission stream is transmitted via a second antenna;
receiving a block of outbound data bits intended for transmission to the another wireless communication device via the plurality of transmission streams;
dividing the block of outbound data bits into a plurality of bit groups, wherein each respective bit group is formed from a same number of different consecutive bits from the block of outbound data bits, and the plurality of bit groups includes a first bit group adjacently followed by a second bit group and also includes a third bit group adjacently followed by a fourth bit group;
generating and outputting a first data stream for first interleaving to generate the first transmission stream, wherein the first data stream includes the first bit group adjacently followed by the third bit group; and
generating and outputting a second data stream for second interleaving to generate the second transmission stream, wherein the second data stream includes the second bit group adjacently followed by the fourth bit group, and each of the first data stream and the second data stream excludes any adjacent bit groups of the plurality of bit groups formed from the block of outbound data bits.

15. The method of claim 14, wherein:
the plurality of bit groups includes the first bit group adjacently followed by the second bit group adjacently followed by a fifth bit group adjacently followed by a sixth bit group adjacently followed by the third bit group adjacently followed by the fourth bit group;
the first data stream includes the first bit group adjacently followed by the fifth bit group adjacently followed by the third bit group; and
the second data stream includes the second bit group adjacently followed by the sixth bit group adjacently followed by the fourth bit group, and the first data stream and the second data stream include a same number of bits.

16. The method of claim 14, wherein:
the plurality of transmission streams also includes a third transmission stream that is transmitted via a third antenna of the plurality of antennas;
the plurality of bit groups includes the first bit group adjacently followed by the second bit group adjacently followed by a fifth bit group adjacently followed by a sixth bit group adjacently followed by the third bit group adjacently followed by the fourth bit group;
the first data stream includes the first bit group adjacently followed by the sixth bit group;
the second data stream includes the second bit group adjacently followed by the sixth bit group adjacently followed by the third bit group; and further comprising:
generating and outputting a third data stream for third interleaving to generate the third transmission stream, wherein the third data stream includes the fifth bit group adjacently followed by the fourth bit group, and the first data stream, and the second data stream, and the third data stream include a same number of bits.

17. The method of claim 14, wherein:
each respective bit group is formed from a different 2 respective consecutive bits from the block of outbound data bits, and the plurality of bit groups includes 2 bits of the first bit group adjacently followed by 2 bits of the second bit group and also includes 2 bits of the third bit group adjacently followed by 2 bits of the fourth bit group;
the first transmission stream is modulated based on a constellation with constellation points respectively represented by more than 2 bits, wherein the first data stream includes the 2 bits of the first bit group adjacently followed by the 2 bits of the third bit group; and
the second transmission stream is also modulated based on the constellation with constellation points respectively represented by more than 2 bits, wherein the second data stream includes the 2 bits of the second bit group adjacently followed by the 2 bits of the fourth bit group.

18. The method of claim 14, wherein:
each respective bit group is formed from a different 2 respective consecutive bits from the block of outbound data bits, and the plurality of bit groups includes 2 bits of the first bit group adjacently followed by 2 bits of the second bit group and also includes 2 bits of the third bit group adjacently followed by 2 bits of the fourth bit group;
the first transmission stream is modulated based on a constellation with constellation points respectively represented by 1 bit, wherein the first data stream includes the 2 bits of the first bit group adjacently followed by the 2 bits of the third bit group; and
the second transmission stream is also modulated based on the constellation with constellation points respectively represented by 1 bit, wherein the second data stream includes the 2 bits of the second bit group adjacently followed by the 2 bits of the fourth bit group.

19. The method of claim 14, wherein:
each respective bit group is formed from a different 1 bit from the block of outbound data bits, and the plurality of bit groups includes 1 bit of the first bit group composed of adjacently followed by 1 bit of the second bit group and also includes 1 bit of the third bit group adjacently followed by 1 bit of the fourth bit group;
the first transmission stream is modulated based on a constellation with constellation points respectively represented by 1 bit, wherein the first data stream includes the 1 bit of the first bit group adjacently followed by the 1 bit of the third bit group; and
generate the second transmission stream is also modulated based on the constellation with constellation points respectively represented by 1 bit, wherein the second data stream includes the 1 bit of the second bit group adjacently followed by the 1 bit of the fourth bit group.

20. The method of claim 14, wherein the wireless communication device includes a wireless station (STA), and the another wireless communication device includes an access point (AP).

* * * * *